United States Patent [19]
Fenton et al.

[11] Patent Number: 5,683,097
[45] Date of Patent: Nov. 4, 1997

[54] INSULATED CONTAINER

[75] Inventors: Timm Fenton, Wooster, Ohio; Dan Hurtienne, Arkansas City, Kans.

[73] Assignee: Rubbermaid Specialty Products Inc., Wooster, Ohio

[21] Appl. No.: 462,162

[22] Filed: Jun. 6, 1995

[51] Int. Cl.[6] ........................................ B62B 1/10
[52] U.S. Cl. ........................ 280/655.1; 280/47.26
[58] Field of Search ........................ 280/638, 37, 38, 280/641, 645, 651, 652, 655.1, 655, 43.1, 43.24, 47.17, 47.19, 47.24, 47.26, 47.36, 47.34, 47.371; 190/18 A

[56] References Cited

U.S. PATENT DOCUMENTS

| | | | |
|---|---|---|---|
| D. 322,198 | 12/1991 | Dringenburg | D7/605 |
| D. 328,221 | 7/1992 | Piccarillo | D7/605 |
| D. 328,689 | 8/1992 | Riskowski | D7/605 |
| D. 341,060 | 11/1993 | Litt et al. | D7/605 |
| D. 353,304 | 12/1994 | Friedrich | D7/605 |
| 3,386,749 | 6/1968 | Roudanez | 280/47.24 |
| 3,591,194 | 7/1971 | Vega | 280/47.26 |
| 4,254,850 | 3/1981 | Knowles | 190/18 A |
| 4,273,222 | 6/1981 | Cassimally et al. | 280/37 |
| 4,460,188 | 7/1984 | Maloof | 280/30 |
| 4,575,109 | 3/1986 | Cowdery | 280/37 |
| 4,618,157 | 10/1986 | Resnick | 280/8 |
| 4,724,681 | 2/1988 | Bartholomew et al. | 62/239 |
| 4,775,072 | 10/1988 | Lundblade et al. | 220/94 |
| 4,846,493 | 7/1989 | Mason | 280/641 |
| 4,873,841 | 10/1989 | Bradshaw et al. | 62/239 |
| 4,932,677 | 6/1990 | Shustack | 280/28.5 |
| 4,974,871 | 12/1990 | Mao | 280/655 |
| 4,976,448 | 12/1990 | Wickersham et al. | 280/47.2 |
| 5,169,018 | 12/1992 | Fiore | 220/318 |
| 5,169,164 | 12/1992 | Bradford | 280/35 |
| 5,184,477 | 2/1993 | Brown et al. | 62/457.7 |
| 5,228,706 | 7/1993 | Boville | 280/43.22 |
| 5,249,438 | 10/1993 | Rhaney et al. | 62/457.7 |
| 5,259,215 | 11/1993 | Rocca | 62/371 |
| 5,269,157 | 12/1993 | Ciminelli et al. | 62/457.7 |
| 5,294,137 | 3/1994 | Barber et al. | 280/47.26 |
| 5,313,817 | 5/1994 | Meinders | 62/457.1 |
| 5,373,708 | 12/1994 | Dumoulin | 62/457.7 |
| 5,468,005 | 11/1995 | Yang | 280/655 |

OTHER PUBLICATIONS

P. 54, Cart; Article in I.D. Annual Design Review about E & B Giftware Inc., Mt. Vernon, New York. Published at least as early as Mar., 1995.

Magazine article, Carryall beach chair; MLe Co., Somerville, New Jersey. Published at least as early as Jul. 23, 1994.

Sell sheet, Cooler; Y Designs, address unknown. Published at least as early as Mar., 1995.

P. 27, Wheeled cooler; Igloo Products Corp. P.O. Box 19322, Houston, Texas 77224–9322. Publication date 1994.

*Primary Examiner*—Richard M. Camby
*Assistant Examiner*—Frank Vanaman
*Attorney, Agent, or Firm*—Richard B. O'Planick; Lisa B. Riedesel

[57] ABSTRACT

An insulated container assembly (10) includes a container base (12) having a front (14) and upper (16) and lower (17) rear wall, bottom (18), and side walls (20) and a lid (22) sized to conform to the container base (12). The insulated container assembly (10) also includes a handle assembly (24) which is pivotably secured to the container rear wall (16) and rotates approximately 180 degrees between an extended operative position and a retracted non-operative position. The single member wheel assembly (26) may be secured to the insulated container (10) such that it is substantially confined by the side (20) and lower (17) and upper (16) rear walls of the insulated container (10).

27 Claims, 11 Drawing Sheets

INSULATED CONTAINER

FIELD OF THE INVENTION

The present invention generally relates to insulated containers and more specifically to portable insulated containers having wheel means, and a handle assembly which pivots and rotates approximately 180 degrees between an operative and a non-operative position.

THE PRIOR ART

Insulated containers, including portable insulated containers, are accepted commercial items. While typical insulated containers often contain handle and wheel assemblies, the handle and wheel assemblies included in a portable insulated container can vary in style and functional abilities.

Many of the prior art handle assemblies do not have the ability to selectively occupy and retain a variety of positions. The ability of the handle assembly to easily maintain a variety of positions is especially important when the user desires to move the portable insulated container, and also when the user desires to store the portable insulated container. While some prior art portable insulated containers have handle assemblies which can be extended, as disclosed in U.S. Pat. No. 4,843,841, the handle assembly can not be selectively maintained in that position. Rather when the user releases the handle assembly, the handle assembly will automatically return to a non-operative position. Other prior art handle assemblies such as illustrated in U.S. Pat. No. 4,724,681 can maintain an operative position, but require several additional components which increase the cost and time of assembly of the handle assembly and portable insulated container.

In addition while many insulated containers include wheel assemblies, many of the wheel assemblies of the prior art portable containers protrude in an outwardly direction from the container outer side or end walls as illustrated in U.S. Pat. Nos. 5,228,706 and 3,591,194. Portable containers which contain wheel assemblies such as these are more difficult to store when not in use. Other prior art portable containers contain wheel assemblies which are retractable when not in use such as disclosed in U.S. Pat. No. 5,373,708. However, the additional components which allow the wheel assembly to be retractable also increase the manufacture and assembly time of the product as well as the final cost of the portable insulated container to the final consumer.

Therefore, it can be appreciated that a portable insulated container having a handle assembly which can be selectively maintained in an operative and non-operative position, and having a wheel assembly which is permanently confined by the container side walls which has a minimum number of components would be an important advance in the art.

It is an object of the invention to provide an insulated container with an improved handle assembly which can be selectively maintained in an operative and non-operative position.

It is another object of the invention to provide an insulated container with improved wheel means confined by the container walls.

It is a further object of the invention to provide an insulated container which can easily be stored when not in use.

It is an additional object of the invention to provide an insulated container which can be easily manufactured and assembled.

It is yet another object of the invention to provide an insulated container having a minimal number of components which will assist in minimizing the manufacturing and assembly expenses.

These and other objects of the present invention as well as the advantages thereof over existing prior art forms, which will become apparent from the description of the preferred embodiment to follow, are accompanied by the improvements hereinafter described and claimed.

SUMMARY OF THE INVENTION

In general, an insulated container or cooler apparatus made in accordance with the present invention includes an insulated container or cooler apparatus having a bottom, front, rear and side walls and a removable lid conformed to fit the insulated container. The insulated container also includes a handle assembly which is generally U shaped and contains a gripping portion. The handle assembly is pivotably secured to the rear wall of the insulated container and is secured such that it rotates approximately 180 degrees between an operative extended position and a non-operative retracted position. The handle assembly also includes a sliding member which assists in allowing selective movement of the handle assembly. The container rear wall contains recesses for receiving the retracted and non-operative handle assembly. The ability of the handle assembly to rotate between positions allows the user to easily store the insulated container when it is not in use. The insulated container also may contain a wheel assembly having a single wheel member, which may be confined in part by the side and rear wall of the container. The confinement of the wheel assembly by the container walls provides for a container which is easier to manufacture, assemble, operate and store.

A preferred exemplary insulated container incorporating the concepts of the present invention is shown by way of example in the accompanying drawings without attempting to show all the various forms and modifications in which the invention might be embodied, the invention being measured by the appended claims and not by the details of the specification.

DESCRIPTION OF THE PREFERRED EMBODIMENT

Figure 1:
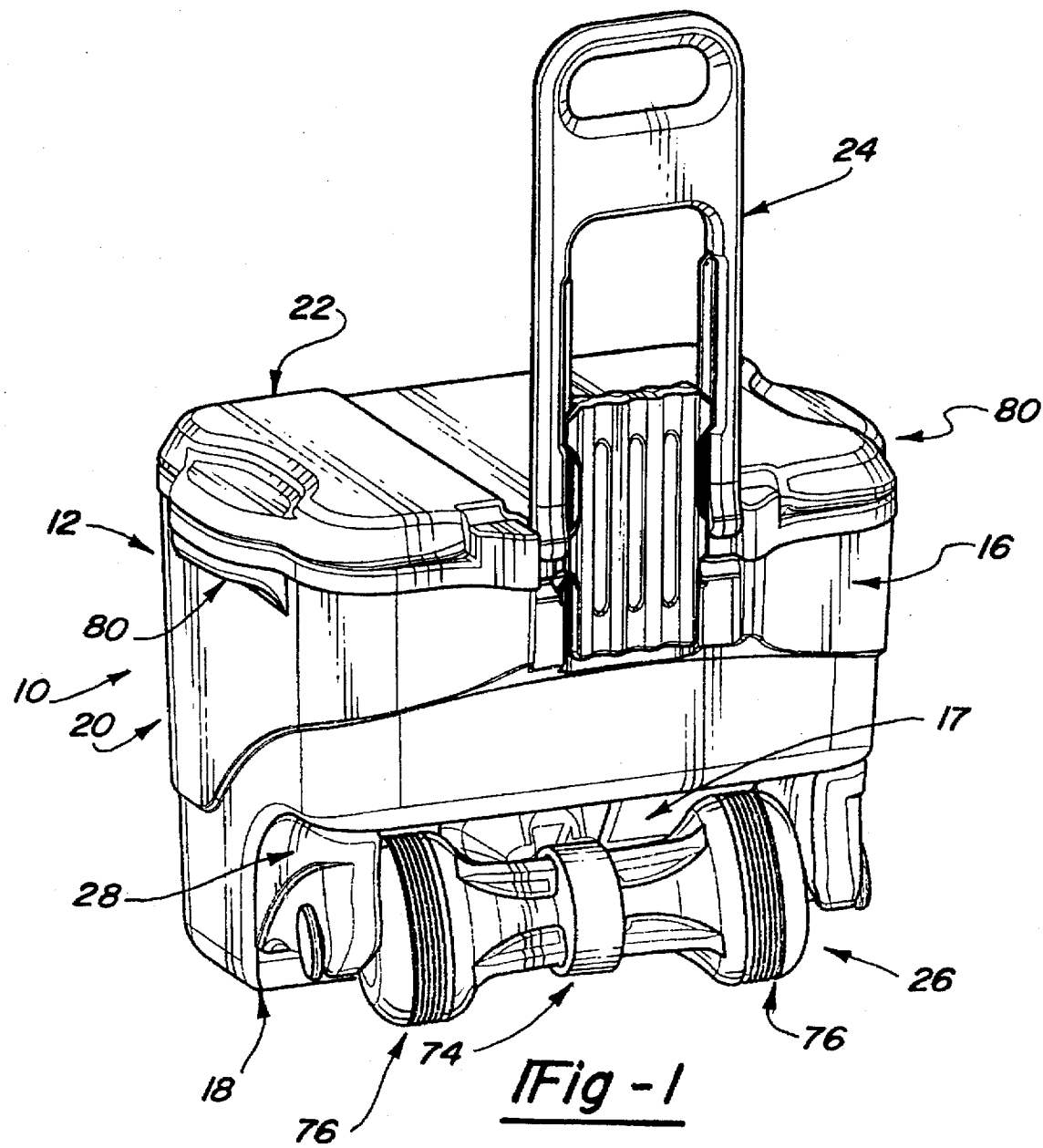
FIG. 1 is a perspective view of the subject container illustrating the handle assembly in an extended operative position.
Figure 2:
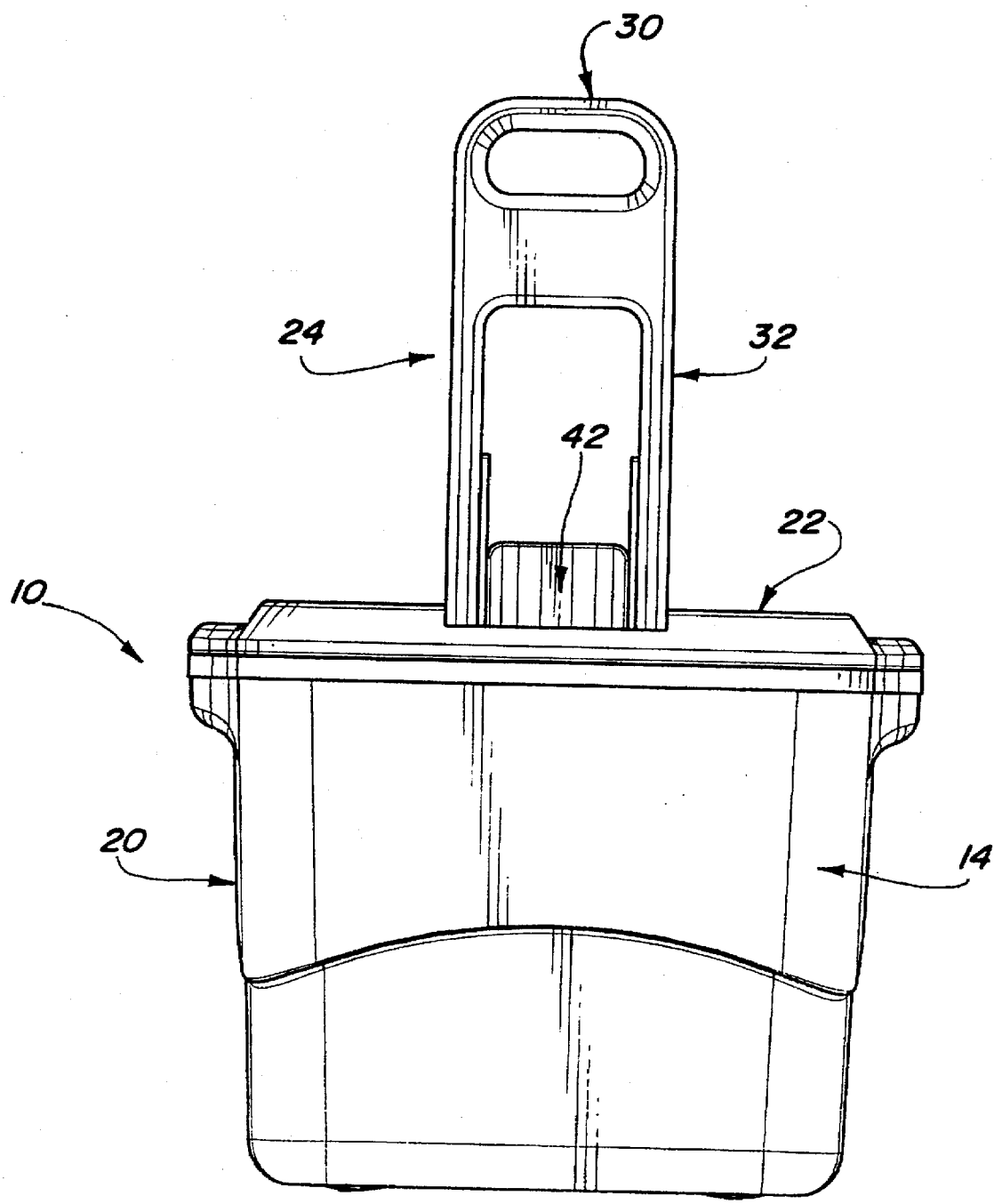
FIG. 2 is a front view of the subject container.
Figure 3:
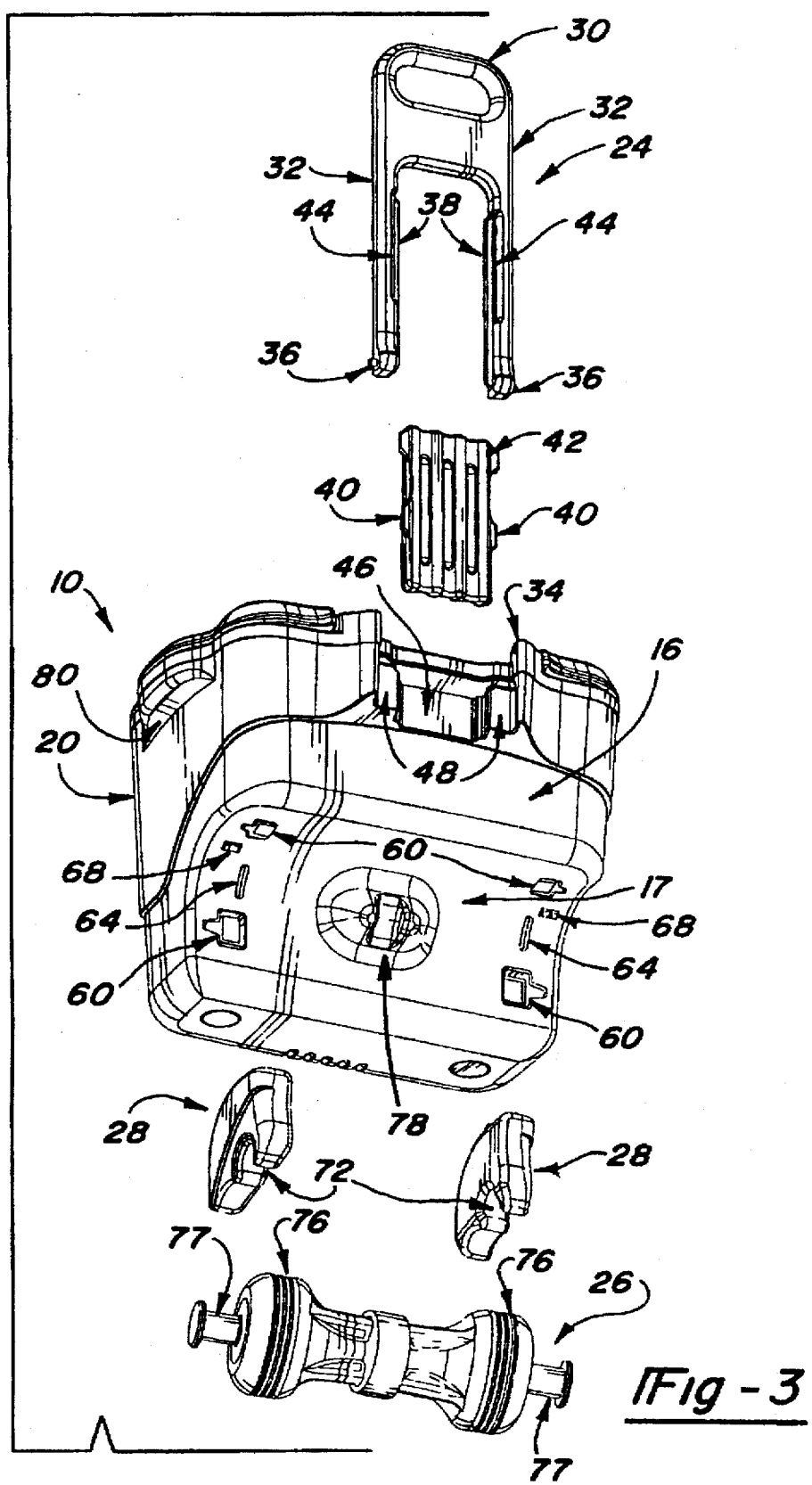
FIG. 3 is an exploded perspective view of the subject container.

Referring to FIGS. 1–3, a container assembly preferably an insulated container assembly, is illustrated generally as 10, having a container base 12 defined by a front 14, an upper 16 and lower rear 17 wall, bottom 18 and two side walls 20. The insulated container also contains a removable lid 22. A handle assembly 24 is pivotably secured to an upper portion of the insulated container upper rear wall 16 as will be described in more detail later. The insulated container 10 may also contain a wheel assembly 26 secured to a lower portion of the insulated container 10.

The wheel assembly 26 is secured to the insulated container 10 such that the wheel assembly 26 is confined in part by the downwardly extending lower rear wall 17 and side walls 20 of the insulated container 10. Alternately, as illustrated in FIG. 3, the wheel assembly 26 may be confined in part by the lower rear wall 17 of the L shaped insulated container, and separate securing means such as securing members 28 which extend in a generally downwardly direction from each of the container side walls 20. The securing members 28 may be in turn be secured to the insulated container 10 by a variety of securing means, as will be discussed in more detail later.

Figure 4:
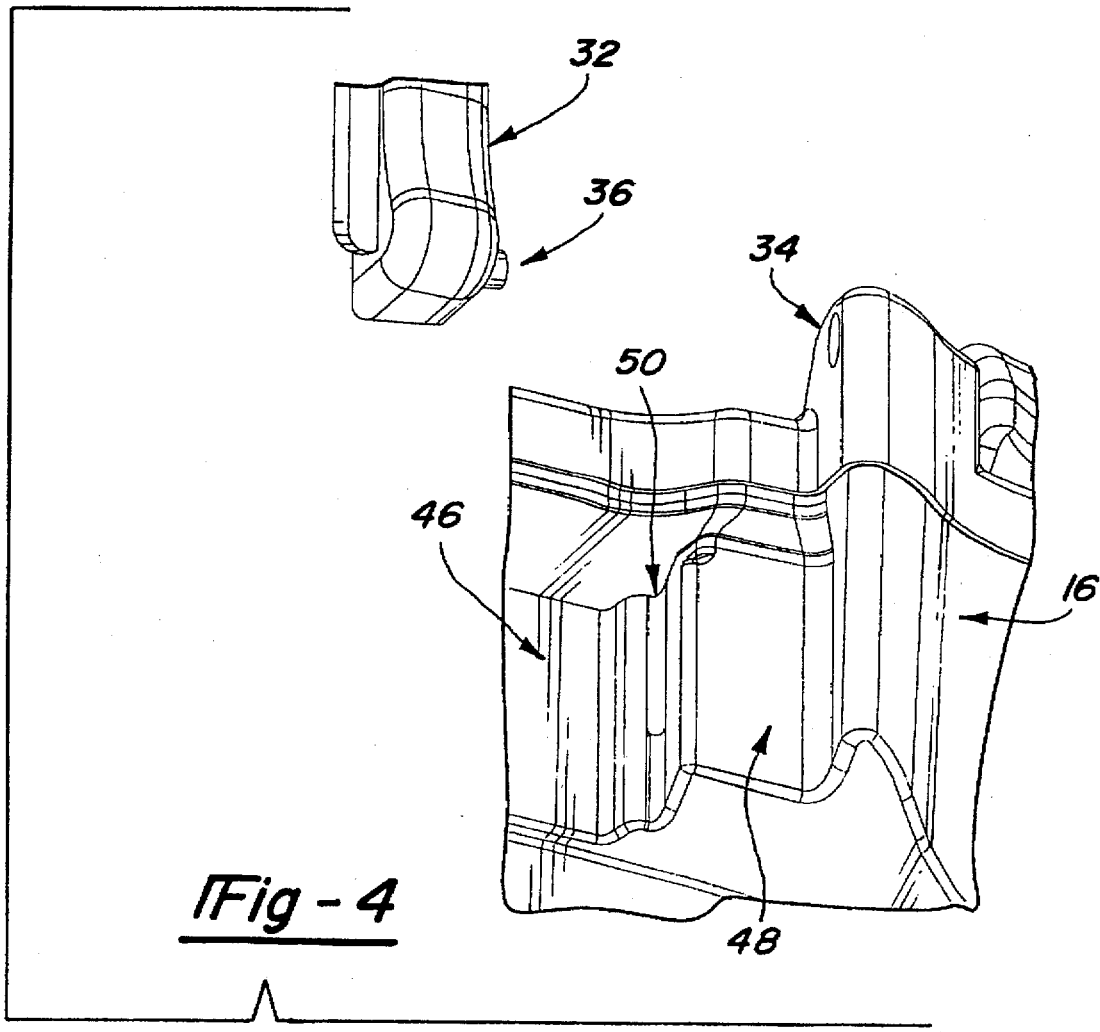
FIG. 4 is an exploded sectional view of the pivotal connection of the handle assembly to the subject container.

As illustrated in FIGS. 1–3, the handle assembly 24 is generally U shaped with a gripping portion 30 and two arm members 32 extending in a generally downward direction from the ends of the gripping portion 30. The arm members 32 are of such a length that when they are secured to the insulated container 10 a user does not have to stoop down to pull the container 10. The arm members 32 are pivotably secured to the rear wall 16, as illustrated in FIGS. 3 & 4 at a location approximately adjacent to an upper portion of the rear wall 16. Apertures 34 are oriented in an approximate center portion of the rear wall 16 for pivotably retaining the arm members 32 of the handle assembly 24. As clearly illustrated in FIGS. 3 & 4, protrusions 36 extend in a generally outwardly direction from a lower portion of each of the arm members 32. The protrusions 36 are sized to be pivotably retained within the rear wall apertures 34. Thus, the pivotal attachment of the arm members 32 to the container rear wall 16 allows the handle assembly 24 to pivot approximately 180 degrees.

Figure 5:
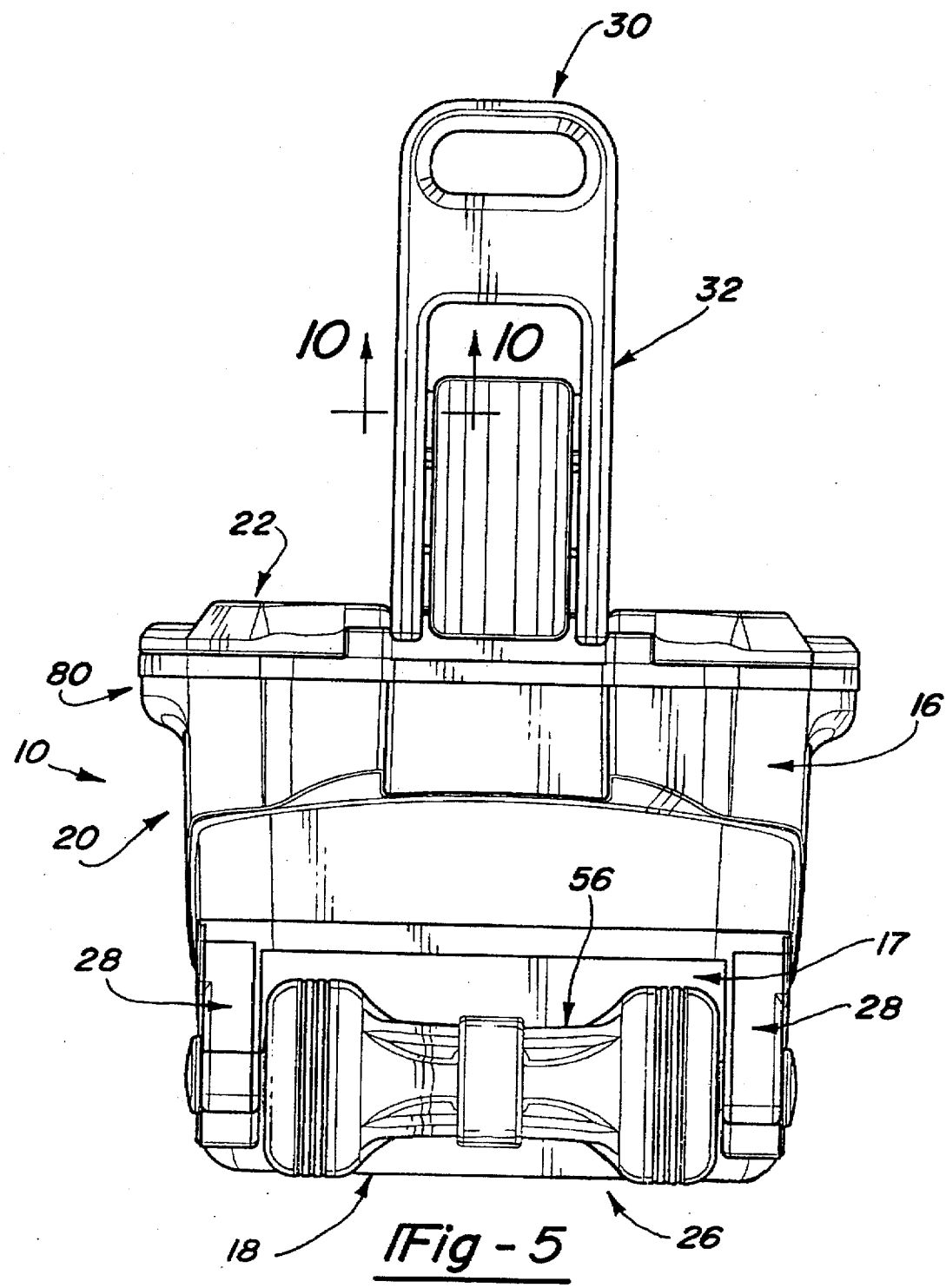
FIG. 5 is a rear view of the subject container illustrating the handle assembly in an intermediary position.
Figure 6:
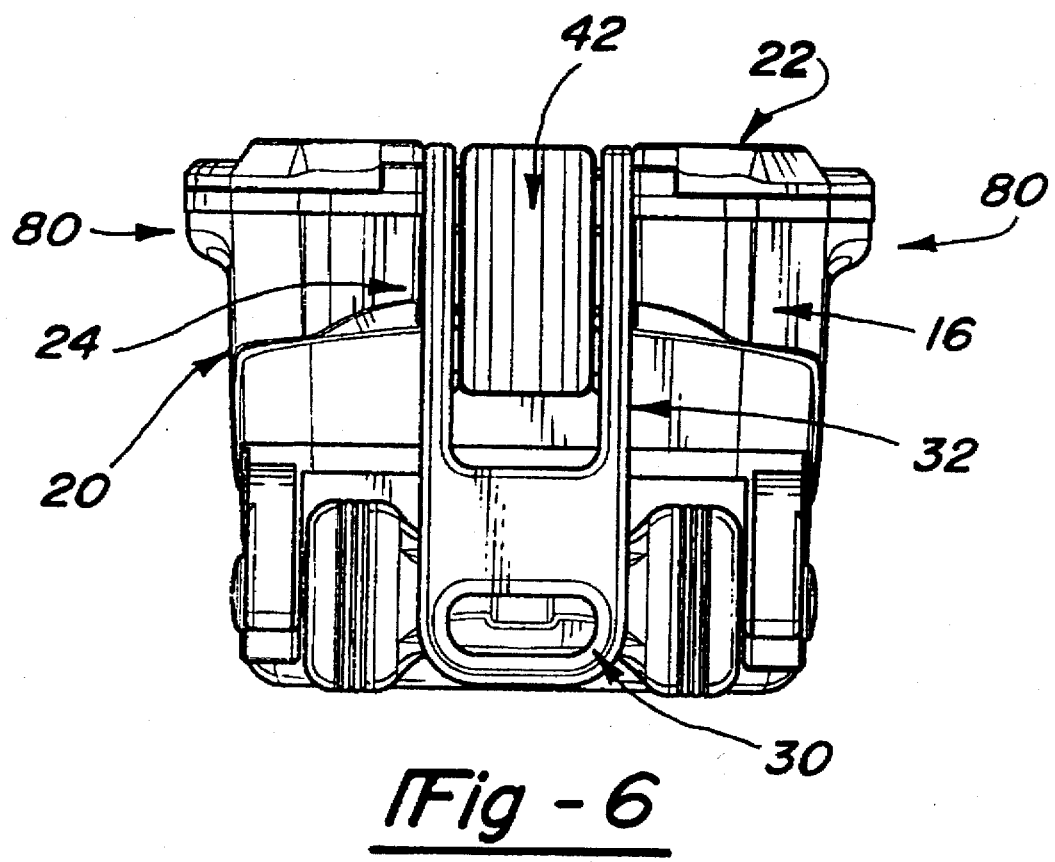
FIG. 6 is a rear view of the subject container illustrating the handle assembly in a retracted non-operative position.

The handle assembly 24 pivots between an extended operative position as illustrated in FIG. 1, and a retracted non-operative position as illustrated in FIG. 6. In order to pivotably rotate the handle assembly 24 from an extended operative position to the retracted position, the handle assembly 24 must first occupy an intermediary position as illustrated in FIG. 5 as will be discussed in more detail later.

Figure 7:
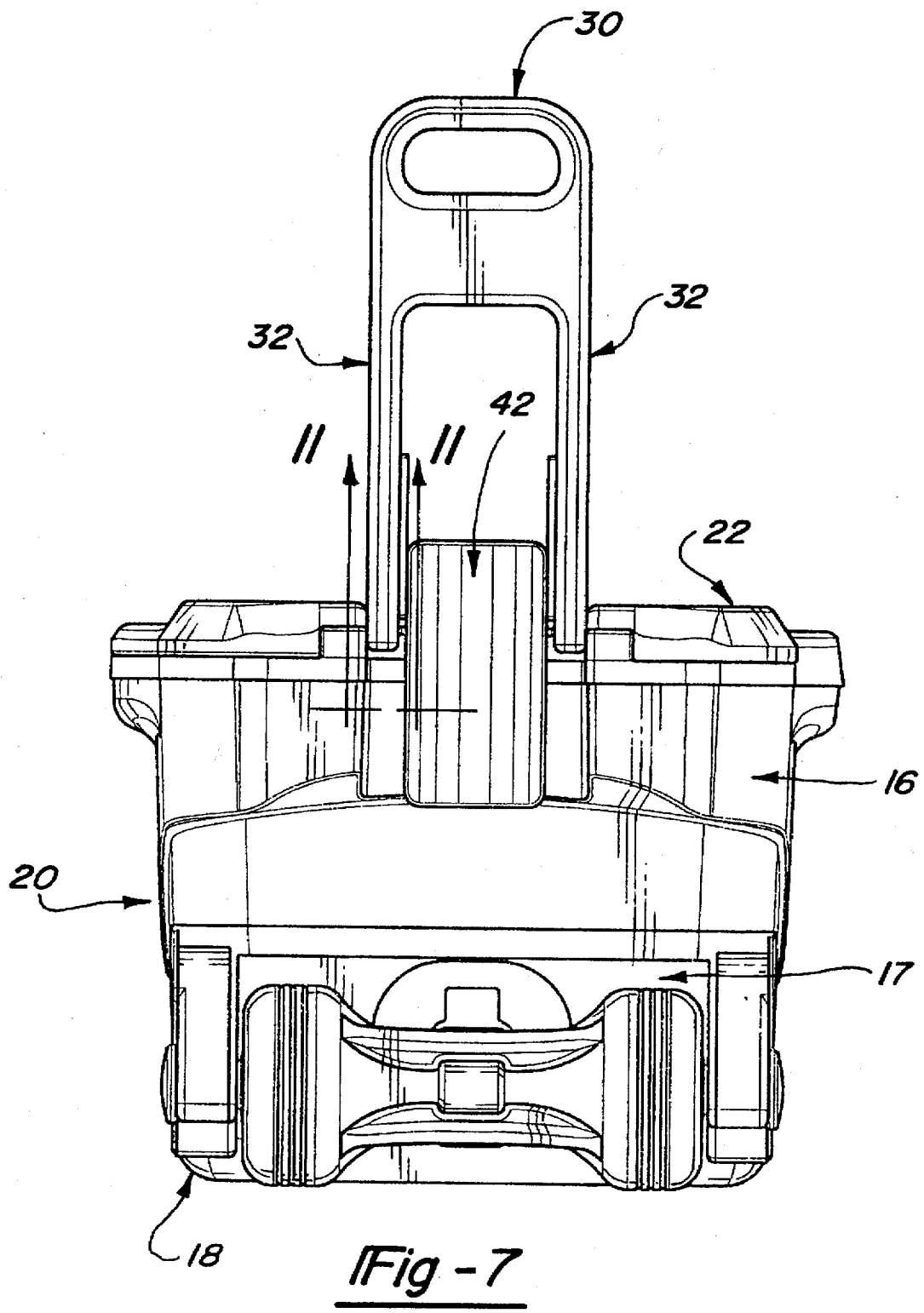
FIG. 7 is a rear view of the subject container illustrating the handle assembly in an extended operative position.

When the arm members 32 of the handle assembly 24 are oriented in the extended operative position, the gripping portion 30 is oriented approximately vertically above the container as illustrated in FIGS. 1 & 7. In contrast, when the arm members 32 of the handle assembly 24 are oriented in a retracted non-operative position, the handle assembly 24 has rotated approximately 180 degrees from the operative position and the gripping portion 30 is oriented approximately adjacent to the approximate center of the wheel assembly 26 as illustrated in FIG. 6.

Figure 8:
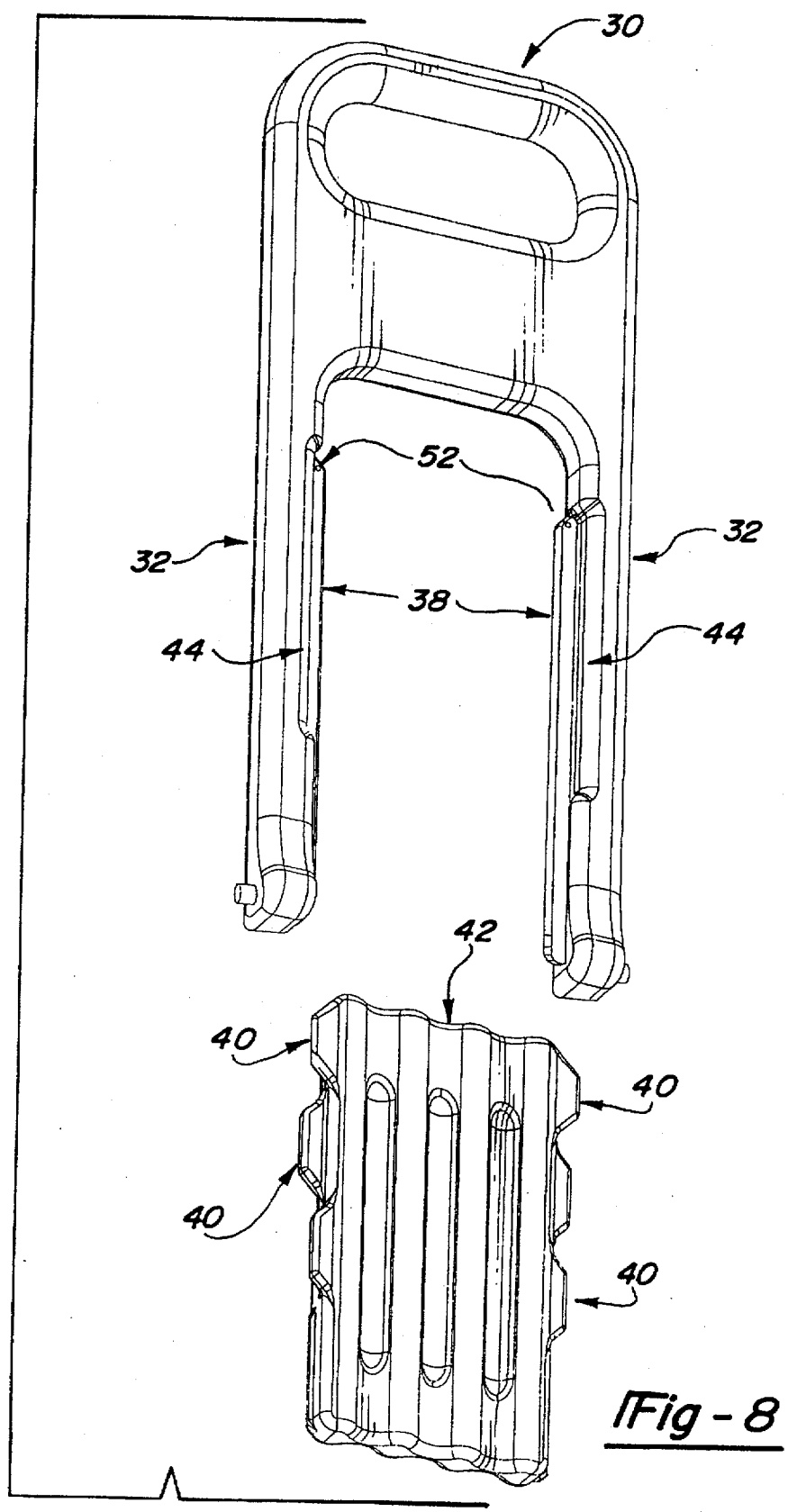
FIG. 8 is an exploded perspective view of the handle assembly of the subject container.

As best illustrated in FIG. 8, each of the arm members 32 includes a lip portion 38, protruding in an outwardly direction towards the center of the handle assembly 24, and extending approximately between the pivotal connection point and the approximate midpoint of each of the arm members 32. As will be discussed in more detail later, the lip portion 38 is disposed approximately in the center of the arm member width, which therefore allows the lip portion 38 to be retained by projections 40 protruding in a generally outwardly direction from a sliding member 42. In addition as will be discussed in more detail later, FIG. 8 also illustrates a portion of each of the arm members 32 containing a slot 44 which therefore, allows projections 40 of varying dimensions to retain the lip portions 38 of the arm members 32. The combination of the slots 44 disposed in the arm members 32 and the lip portions 38 protruding in a direction towards the center of the handle assembly 24 allows the arm members 32 of the handle assembly 24 to be retained by another member of the handle assembly 24, specifically the sliding member 42 as clearly illustrated in FIGS. 3 & 8.

FIGS. 3 & 8 illustrate an exploded view of the handle assembly 24 including the arm members 32 and the sliding member 42. The sliding member 42 assists in maintaining the handle assembly 24 in either an extended operative position or a retracted non-operative position. Depending upon the desired position of the handle assembly 24 the sliding member 42 may be disposed at various positions with respect to the arm members 32 and the rear wall 16, as illustrated in FIGS. 1, 5 & 6.

The sliding member 42 is clearly illustrated in FIGS. 1, 3, & 8 and is generally rectangularly shaped having two side walls, top wall and bottom wall. The sliding member 42 is sized to easily be retained within the centermost recess 46 in the rear wall 16, which will be discussed in more detail later. At least two projections 40 extend in a generally outwardly direction from each of the side walls. The preferred embodiment of the sliding member 42 as clearly illustrated in FIGS. 3 & 8, contains four projections 40 of varying sizes projecting in an outwardly direction from each of the side walls. The projections 40 are staggered at various locations along the width and height of the sliding member 42 such that the separated and staggered projections 40 will securely retain the lip portion 38 protruding outwardly from each of the arm members 32 when the handle assembly 24 is occupying an extended, intermediary and retracted positions, as illustrated in FIGS. 1, 5–6. The slots 44 in the arm members 32 allow for the larger projections 40 to securely retain the lip portion 38 by allowing the projections 40 to be disposed in the slots 38 thereby preventing the projections 40 from protruding in an outwardly direction from the arm members 32.

The sliding member 42 has the ability to be positioned at various positions with respect to the arm members 32 and protruding lip portions 38 due in part to rear wall recesses 46 & 48 of varying elevations disposed within the approximate center portion of the rear wall 16 as illustrated in FIGS. 1, 3, 5 & 9. As clearly illustrated in these figures, the rear wall recesses 46 & 48 are of various elevations, and at least one of the recesses includes channels for receiving sliding member projections 40. The recesses 46 & 48 allow the sliding member 42 to be at least partially confined by the rear wall 16 when the handle assembly 24 is occupying an extended position as illustrated in FIG. 1. In addition, the recesses 46 & 48 allow the arm members 32 and sliding member 42 of the handle assembly 24 to be at least partially confined by the rear wall 16 when the handle assembly 24 pivots from an extended operative position to a retracted non-operative position as illustrated in FIG. 6.

As discussed earlier and clearly illustrated in FIGS. 3, 4 & 9, the rear wall 16 recesses 46 & 48 consists of recesses of various elevations. Specifically, a centermost recess 46 is positioned in the approximate center of the rear wall 16. The centermost recess 46 is defined by upwardly extending side edges and a bottom edge. The dimensions of the centermost recess 46 should be sized to correspond to the approximate dimensions of the sliding member 42 as the sliding member will slideably move within the centermost recess 46. In addition, when the handle assembly 24 is occupying the retracted position as illustrated in FIG. 6, the entire sliding member 42 will be disposed within the centermost recess 46.

A generally C shaped channel 50 is disposed within the centermost recess 46 adjacent each side edge of the centermost recess. The C shaped channel 50 is closed on the bottom portion and open on the top portion. When the handle assembly 24 is occupying the extended operative position, a lowermost projection 40 is received within the C shaped channel 50. Therefore, the closed bottom portion precludes the lowermost projection 40 and the sliding member 42 from moving further in a downwardly direction in the centermost recess 46 when the handle assembly occupying the extended operative position.

Approximately adjacent the side edges of the centermost recess 46, the rear wall 16 also contains side recesses 48 dimensioned such that as the arm members 32 of the handle assembly 24 pivot in a downwardly direction, the arm members can be positioned such that they are at least partially confined within the side recesses 48. The side recesses 48 are generally L shaped and therefore contain one upwardly extending side edge. When the handle assembly 24 is occupying a retracted non-operative position the arm members 32 are disposed approximately adjacent each of the upwardly extending side edges. Thus, the combination of the centermost recess 46 and the side recesses 48 in the rear wall 16 prevent the arm members 32 and sliding member 42 of the handle assembly 24 from protruding in a generally outwardly direction from the container rear wall 16. Therefore, the container will be easier to store when the handle assembly 24 is occupying a retracted and non-operative position.

Figure 10:
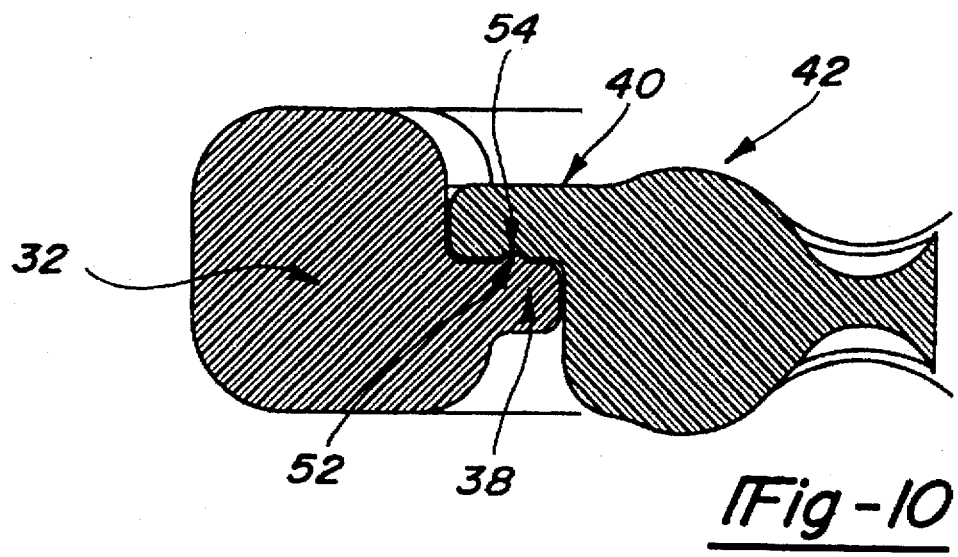
FIG. 10 is a sectional view of the subject container taken along the Line 10—10 of FIG. 5.
Figure 11:
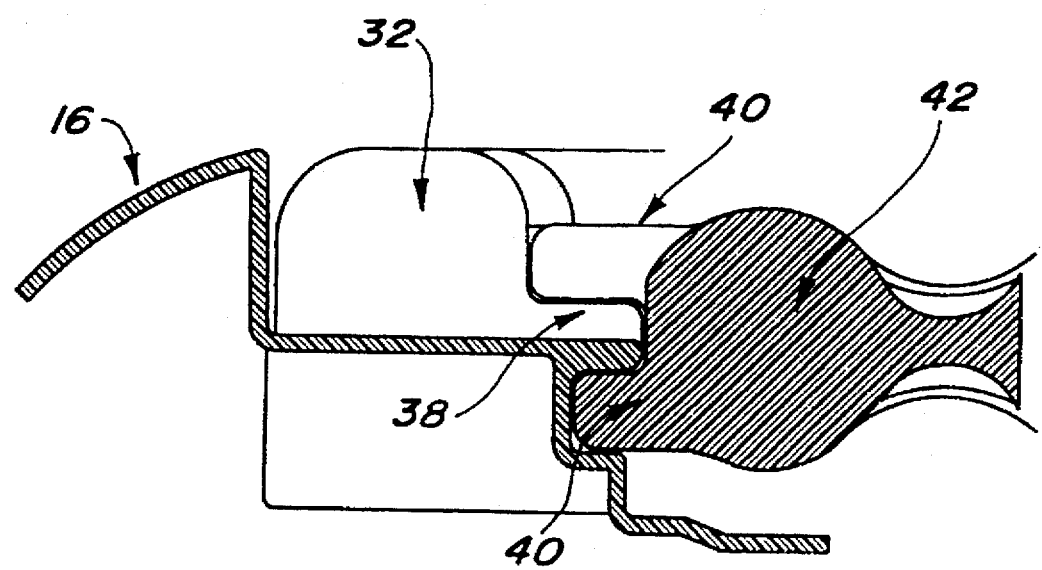
FIG. 11 is a sectional view of the subject container taken along the Line 11—11 of FIG. 7.

The handle assembly 24 will also include stopping means for assisting in stopping and preventing further upwardly movement between the arm members 32. Specifically, as illustrated in FIGS. 7 & 10 a detent 52 is disposed on an upper portion on at least one of the lip portions 38 and a corresponding detent aperture 54 is disposed on at least one of the uppermost projections 40. The preferred embodiment would include detents 52 on the upper portion of each of the lip portions 38 and corresponding detent apertures 54 on the uppermost projections 40. The detent 52 and detent apertures 54 act as stopping means for assisting in preventing the sliding member 42 from sliding further upwardly between the arm members 32.

It is necessary to slide the sliding member 40 in an upwardly direction when the user desires to pivotably rotate the handle assembly 24 between an extended and retracted position. In order to pivotably rotate the handle assembly 24 approximately 180 degrees the handle assembly 24 must first occupy an intermediary position as illustrated in FIG. 5. When the sliding member 42 is occupying the intermediary position the sliding member 42 is pushed in a generally upwardly direction until at least one detent 52 in an upper portion of the lip portion 38 is received in a corresponding detent aperture 54 in an uppermost projection 40, thereby preventing the sliding member 42 from further upward movement. When the detent 52 has been engaged by the detent aperture 54, all projections 40 including the lowermost projection 40 will be slideably retaining the arm members 32. Therefore, no portion of the sliding member 42, including projections 40, will be retained within the centermost recess. Thus, the handle assembly 24 can freely pivot approximately 180 degrees from the intermediary position to the retracted position, wherein the arm members 32 and sliding member 42 will be disposed in the side recesses 48 and centermost recess 46 respectively.

In addition, to the upper portions of the lip portions 38 containing detents 52 and the uppermost projections 40 containing corresponding detent apertures 54, detents 52 and corresponding detent apertures 54 may also be disposed on other portions of the lip portion 38 and projections 40 to assist in guiding the sliding member 42 between the arm members 32. These detents 52 and corresponding detent apertures 54 will also act as a stopping means for assisting in preventing the sliding member 42 from selectively moving either while the handle assembly 24 is occupying a retracted or extended position.

Figure 9:
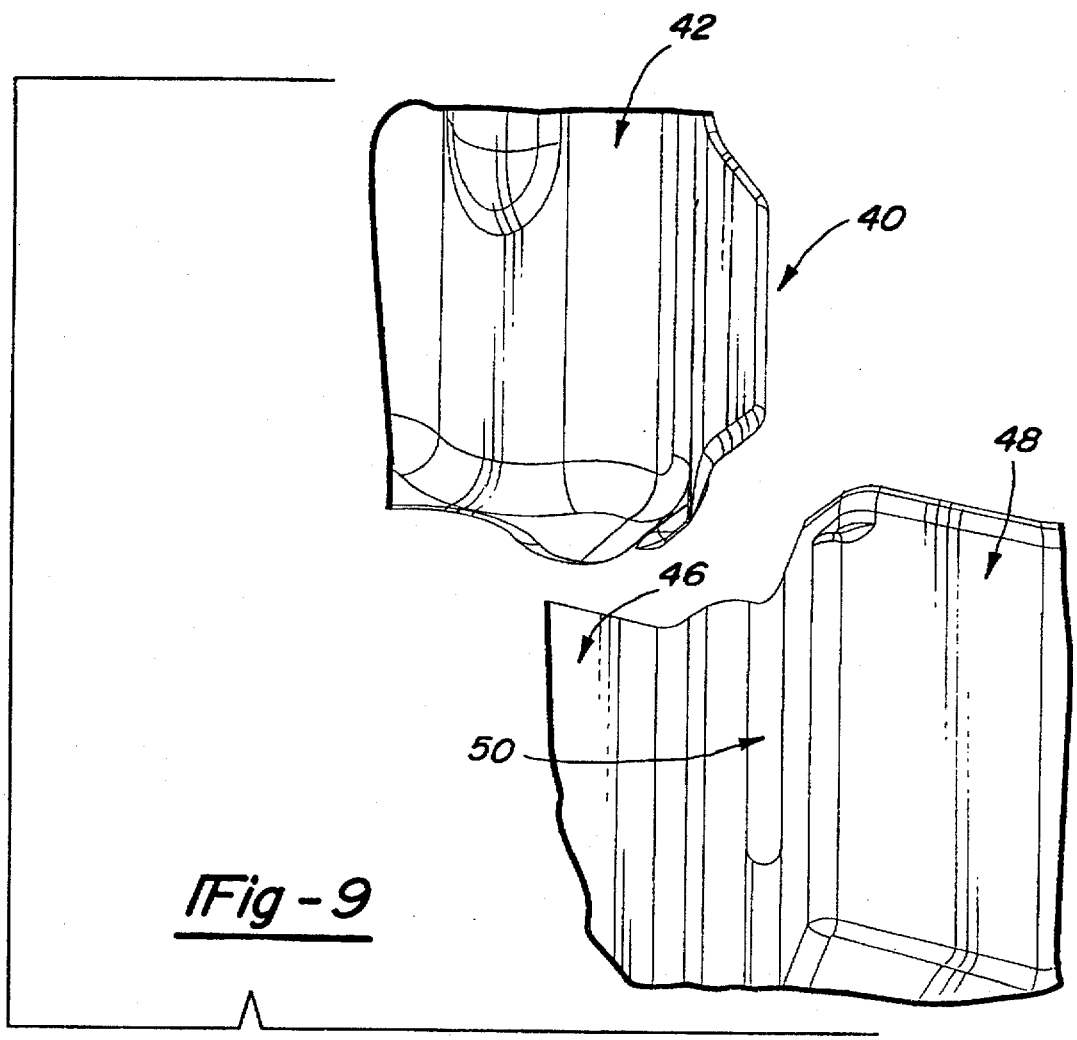
FIG. 9 is an exploded sectional view of the rear wall of the subject container and the sliding member.

In operation, when the handle assembly 24 is positioned in the extended operative position as illustrated in FIG. 1, a user may pull the insulated container 10 over a variety of surfaces while holding the gripping portion 30 of the handle assembly 24. The handle assembly 24 will remain in the extended operative position since the lowermost projections 40 on each side of the sliding member 42 are retained within the C shaped channels 50 in the centermost recess 46 as illustrated in FIGS. 7 & 9. The remaining projections 40 will slideably engage the lip portions 38 protruding outwardly from each of the arm members 32 of the handle assembly 24. Thus, the combination of the lowermost projections 40 retained within the generally C shaped channel 50 and the remaining projections 40 retaining the lip portions 38 allows the handle assembly 24 to remain in the extended operative position until the user desires to alter the position of the handle assembly 24. At any time, including when the handle assembly 24 is occupying an extended position, the user can easily remove the lid 22 from the container 10 as the lid 22 is dimensioned such that it does not interfere with the handle assembly 24.

When the user desires to pivotably rotate the handle assembly 24 to the retracted non-operative position as illustrated in FIG. 6, the handle assembly 24 must first occupy the intermediary position as illustrated in FIG. 5. Therefore, the user must push the sliding member 42 in a generally upwardly direction until the detents 52 in an upper portion of the lip portions 38 are engaged by corresponding detent apertures 54 in the uppermost projections 40 as illustrated in FIG. 10. The engagement of the detents 52 and detent apertures 54 will prevent continued generally upwardly movement of the sliding member 42. When the detent 52 is engaged within the detent aperture 54, the lowermost projections 40 will be disengaged from the generally C shaped channels 50 disposed in the centermost recess 46. Therefore, no portion of the sliding member 42 will be disposed within the centermost recess 46 of the container rear wall 16. The lowermost projections 40, in combination with other projections 40, will cooperate to slideably retain each of the lip portions 38 protruding in an outwardly direction from each of the arm members 32. Therefore, the combination of all the projections 40 slideably retaining the arm members 32 and the sliding member 42 no longer being disposed within the centermost recess 46 allows the handle assembly 24 to occupy the intermediary position as illustrated in FIG. 5.

When the handle assembly 24 occupies the intermediary position the handle assembly 24 is able to freely pivot approximately 180 degrees to the retracted non-operative position. As the handle assembly 24 pivots between the positions illustrated in FIGS. 5 & 6, the sliding member projections 40 continue to engage the lip portions 38 therefore continuing to secure together the sliding member 42 and the arm members 32 of the handle assembly 24. Therefore, as the arm members 32 pivot and rotate approximately 180 degrees, the sliding member 42 also rotates approximately 180 degrees. The handle assembly 24 will stop rotating as the arm members 32 and the sliding member 42 comes into direct contact with the side recesses 48 and the centermost recess 46, respectively. The lip portions 38 will continue to be retained by the sliding member projections 40. When the sliding member 42 is disposed within the centermost recess 46 the sliding member 42 is approximately flush with the container rear wall 16. Similarly, when the arm members 32 are disposed in the side recesses 48 they are also approximately flush with the container rear wall 16. Therefore, the container 10 is easy to store since the handle assembly 24 is essentially recessed within the container rear wall 16 and does not protrude in an outwardly direction from the container rear wall 16.

As briefly discussed earlier, the container may also contain wheel assembly 26 such as a single wheel or roller member. It is desirable to have a single wheel member 56 secured to the insulated container 10 in order to minimize the number of components used in the container assembly. In order to provide optimum storage and handling characteristics the wheel member 56 is secured to the container such that substantially all of the wheel member 56 is confined by the container side walls 20 and securing members 28 and a lower portion of the rear wall 16. Thus the additional securing members 28 are the only additional components necessary to secure the wheel member 56 to the insulated container 10.

Figure 12:
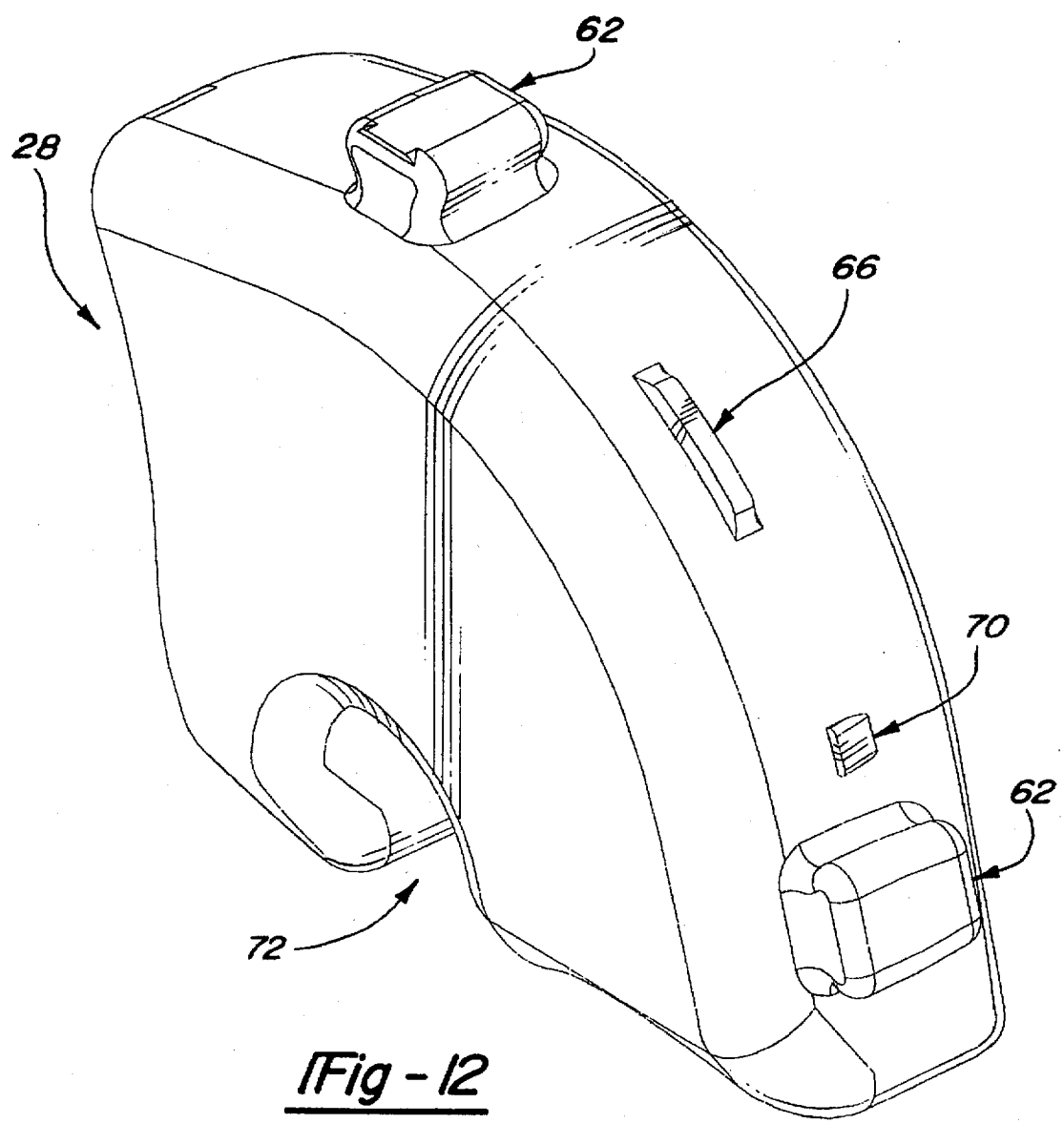
FIG. 12 is a perspective view of the securing member which assists in securing the wheel member to the subject container.

As indicated earlier the container rear wall includes an upper 16 and a lower portion 17. Specifically, as illustrated in FIGS. 1, 2 & 3, securing members 28 extend in a generally downwardly direction from each of the generally L shaped container side walls 20. The securing members 28 may be secured to a the lower rear wall 17 by a variety of means. Specifically, as illustrated in FIG. 3, several pockets 60 of various dimensions are oriented adjacent outer edges of the lower rear wall 17, approximately adjacent the L shaped side walls 20. FIG. 3 clearly illustrates two generally rectangularly shaped pockets 60 disposed adjacent each outer edge of the lower rear wall 16. The pockets 60 as illustrated in FIG. 3 are sized to receive the lugs 62 protruding in a downwardly direction from each of the securing members 28 as illustrated in FIG. 12. The lugs 62 have a generally larger bottom portion as compared to the top portion, wherein the top portion is oriented adjacent the securing member 28. As illustrated in FIG. 3, each of the generally rectangularly shaped pockets 60 are tapered such that the lower portion of the pockets 60 is generally larger than the upper portion of the pocket 60, thereby ensuring that the lugs 62 can be securely retained within the pocket 60.

The lower rear wall 17 may contain additional pockets 64 having a generally elliptical shape sized to receive corresponding lugs 66 protruding in an outwardly direction from each of the securing members 28. In addition, a detent aperture 68 is disposed between the pockets 60 and sized to receive a detent 70 protruding in an outwardly direction from the securing member 28. The detent aperture 68 is tapered such that the aperture 68 has a wider opening disposed towards the approximate center of the lower rear wall 17 as compared to the opening disposed approximately adjacent the outer edges of the lower rear wall 17. The corresponding detent 70 is sized to be retained within the aperture 68. Therefore, the variance in the opening of the detent aperture 68 helps to ensure that once the detent 70 is inserted within the aperture 68, it can not be easily removed from the detent aperture 68. Thus, the detent 70 and detent aperture 68 assist in securing together the securing member 28 and the container 10, and minimizing the likelihood of independent movement of either the securing member 28 or the container 10.

The lugs 62 & 66, and detents 70 disposed on the securing member 28 and container 10 can easily be secured within the corresponding pockets 60 & 64, and detent apertures 70 on the lower rear wall 17 of the container. Therefore, the container 10 can be easily assembled without additional tools and without much time expended.

A lower portion of each of the securing members 28 contains a generally C shaped opening 72 which is sized to receive and retain a portion of the wheel assembly 26. The wheel assembly 26 as most clearly illustrated in FIGS. 1 & 3 is a generally cylindrically shaped member having an approximately center portion 74 and two end portions 76. The diameter of the end portions 76 is generally larger than the diameter of the center portion 74. Therefore, when the wheel member is secured by the generally C shaped opening 72 in the securing members 28, the end portions 76 of the wheel assembly 26 will be in constant contact with a surface over which the container 10 is being moved.

The wheel member 56 may be secured to the securing member 28 by a variety of ways. Illustrated in FIG. 3, pin members 77 protrude in a generally outwardly direction from each of the end portions 76 and are sized to be securely received and retained in the opening 72 within the securing member 28. As illustrated in FIG. 3, the opening is generally C shaped, however, an opening 72 of various sizes and shapes may be used to securely receive and retain the pin members 77. Once each of the pin members 77 is received and retained within the C shaped opening 72, no other portion of the wheel member 56 projects beyond the container side walls 20 or securing members 28. Therefore, the wheel member 56 is securely confined by the lower and upper rear walls 17 & 16, the side walls 20 and securing members 28.

In order to assist in stabilizing the wheel assembly 26 as the wheel member 56 moves and rotates over a variety of surfaces the approximate center portion 78 of the lower rear wall 17 may also extend outwardly thereby confining and securing together the approximate center portion 74 of the wheel member 56 and the container lower rear wall 17. Thus the wheel member 56 will continue to rotate as the container 10 and wheel member 56 are moved over a variety of surfaces, however the end 76 and center portions 74 of the wheel member 56 may be secured to the container lower rear wall 17.

Therefore, the subject invention provides for a container 10 which can easily be moved between various locations without the wheel member 56 getting caught on various items. The confinement of the a substantial portion of the wheel member 56 between the securing member 28 and the container lower rear wall 17 also minimizes the contact between the wheel member 56 and a user, when and if, the user elects to carry the container 10 using the molded in handles 80 oriented adjacent each of the sidewalls 20 of the container 10. In addition, the use of a subject wheel assembly 26 provides for a portable container which can travel over a variety of surfaces including hard and rigid surfaces such as sidewalks and softer surfaces such as sand.

The design of the subject container 10 allows for the container 10 to be easily assembled using a minimum number of components and additional time. In addition, the use of separate securing members 28 which are subsequently secured to the container side walls 20 allows for the container 10, handle assembly 24 and wheel assembly 26 to be easily molded together. Also, the container 10 can easily be stored in a variety of locations by rotating the handle assembly 24 approximately 180 degrees such that the handle assembly 24 is occupying the retracted and non-operating position.

It should thus be appreciated that an insulated container 10 constructed in accordance with the concepts of the present invention, as described herein, accomplishes the objects of the present invention and otherwise substantially improves the art.

We claim:

1. A cooler apparatus comprising:
   a cooler base comprising a front, rear, bottom and two side walls;
   a removable lid;
   a handle assembly pivotably secured to said cooler base rear wall, said handle assembly pivoting between a first and a second position and comprising two spaced apart arm members, each having an inwardly facing channel;
   a sliding member disposed within an approximate center of said handle assembly and comprising projection members captured and reciprocally moveable within the arm member channel for assisting in selectively allowing said handle assembly to pivot between said first and second positions.

2. A cooler apparatus comprising a cooler base comprising
   a front, rear, bottom and two side walls;
   a removable lid;
   a handle assembly pivotably secured to said cooler base rear wall, said handle assembly pivoting between a first and a second position;
   sliding means disposed on said handle assembly for assisting in selectively allowing said handle assembly to pivot between said first and said second positions;
   recess means disposed in said cooler base rear wall for selectively retaining a portion of said sliding means thereby selectively allowing said handle assembly to pivot between said first and said second positions.

3. A cooler apparatus according to claim 1, said handle assembly pivotal between said first position when said handle assembly is occupying an extended position and said second position when said handle assembly is occupying a retracted position, said handle assembly rotating approximately 180 degrees between said first and said second positions.

4. A cooler apparatus according to claim 1, said cooler apparatus further comprising wheel means secured to said cooler base for assisting said cooler apparatus in moving on a variety of surfaces.

5. A cooler apparatus according to claim 4, said cooler apparatus further comprising securing means disposed in each of said cooler base side walls for securing said wheel means to said cooler base.

6. A cooler apparatus according to claim 5, said wheel means further comprising a generally tubular member having two end portions, each of said end portions having pin members protruding in a generally outwardly direction, said pin members shaped to be retained by said securing means thereby securing said wheel means to said cooler base.

7. A cooler apparatus according to claim 4, said wheel means further comprising a generally tubular member having two elevated end portions.

8. A cooler apparatus according to claim 7, said end portions and a center portion of said tubular member directly contacting a variety of surfaces when said cooler is moved over a variety of surfaces.

9. A cooler apparatus comprising:
   a cooler base defined by a front, bottom, rear and two side walls;
   a removable lid for covering a top opening of said cooler base;
   a handle assembly pivotably secured to said cooler base rear wall about a first axis and pivotably moveable through an arc of approximately 180 degree between a retracted non-operative position wherein said handle assembly is approximately parallel to said cooler base rear wall and an extended operative position wherein said handle assembly is disposed approximately 180 degrees relative to the position of said handle assembly when said handle assembly is in its non-operative position;
   moveable means disposed within an approximate center of said handle assembly for assisting in maintaining said handle assembly in either an extended operative or a retracted non-operative position;
   roller means disposed in said bottom wall for allowing said cooler base to be moveable over a variety of surfaces; and
   said cooler base further comprising recess means disposed in an approximate center of said rear wall, said recess means for receiving a portion of said moveable means when said handle assembly is occupying an extended operative position.

10. A cooler apparatus according to claim 9, said moveable means further comprising a generally rectangularly shaped member having at least two projections extending in an outwardly direction from at least two sides of said member, said projections for retaining arm members of said handle assembly.

11. A cooler apparatus according to claim 9, said moveable means further comprising a generally rectangularly shaped member having at least four projections extending in an outwardly direction from at least two sides of said member, at least some of said projections for retaining arm members of said handle assembly.

12. A cooler apparatus according to claim 9, said moveable means further comprising a member having at least two sides having an uppermost projection and a lowermost projection extending in a generally outwardly direction from each of said two sides, said uppermost projections retaining arm members of said handle assembly, and said lowermost projections retained within said recess when said handle assembly is occupying an extended operative position.

13. A cooler apparatus according to claim 9, said moveable means further comprising locking means disposed adjacent an upper portion of said moveable means, said locking means for locking with said handle assembly and preventing further movement of said moveable means.

14. A cooler apparatus according to claim 9, said cooler apparatus further comprising securing means disposed in a lower portion of each of said cooler base side walls for securing said roller means adjacent said cooler base.

15. A cooler apparatus according to claim 14, said roller means further being partially confined by said cooler base rear wall and said securing means extending in a generally downwardly direction from each of said cooler base side walls.

16. A cooler apparatus according to claim 14, said roller means further comprising a generally tubular member having an approximate center portion and two end portions, said end portions having a greater diameter than said center portion.

17. A cooler apparatus according to claim 16, said tubular member further comprising a connecting member extending in a generally outwardly direction from each of said end portions, said connecting member selectively retained within openings disposed in said securing means.

18. A portable cooler apparatus, said cooler apparatus adapted to move on a variety of surfaces, said apparatus comprising:
- a cooler base defined by a front, bottom, rear and two side walls;
- a removable lid for covering a top opening of said cooler base;
- a handle assembly further comprising:
  - two arm members pivotably secured to said cooler base rear wall about a first axis and pivotably moveable through an arc of approximately 180 degrees between a retracted non-operative position and an extended operative position;
  - a pocket disposed in an approximate center portion of said cooler base rear wall;
  - a maintaining member moveable between said arm members and said pocket oriented within said cooler base rear wall, said maintaining member assisting in maintaining said handle assembly in either an extended operative or a retracted non-operative position; roller means secured to said cooler base, whereby said cooler apparatus is easily moveable over a variety of surfaces.

19. A portable cooler apparatus according to claim 18, said maintaining member further comprising at least two projections extending in an outwardly direction from at least two sides of said member, one of said projections disposed in each side of said maintaining member for retaining a portion of said arm members and one of said projections disposed in each side of said maintaining member for engaging said pocket.

20. A portable cooler apparatus according to claim 19, said handle assembly further comprising detents disposed in at least one of said arm members and a corresponding detent aperture disposed in at least one of said projections on each side of said maintaining member, said detents and said detent apertures for preventing said maintaining member from further movement.

21. A portable cooler apparatus according to claim 18, said cooler apparatus further comprising securing means containing an aperture disposed in a lower portion of each of said cooler base side walls, said apertures for assisting in securing roller means adjacent to said cooler apparatus such that said roller means is oriented approximately adjacent said cooler base rear wall.

22. A portable cooler apparatus according to claim 21, said roller means further comprising a generally tubular member having two ends, a connecting member extending in a generally outwardly direction from each of said ends, said connecting member sized to be retained within said apertures.

23. A portable cooler comprising:
- a cooler compartment having a front, bottom, rear and two side walls;
- a lid handle assembly pivotably secured to said cooler compartment rear wall;
- a sliding member reciprocally moveable along the handle assembly for assisting in maintaining the positions of said handle assembly;
- a recess within the cooler compartment rear wall for receiving the sliding member therein; and securing means extending in a generally downwardly direction from said side walls for assisting in securing roller means to said cooler compartment adjacent each of said side walls; said securing means securing said roller means such that said roller means is confined approximately between said securing means and said cooler compartment rear wall.

24. A portable cooler according to claim 23, said handle assembly further comprising a generally U shaped handle having a gripping portion and two arm members extending from the ends thereof, said arm members being pivotably secured to said cooler compartment rear wall, said arm members further comprising locking means for selectively preventing said handle assembly from pivoting between a first and a second position.

25. A portable cooler comprising:
- a cooler compartment having a front, bottom, rear and two side walls;
- a lid;
- a handle assembly pivotably secured to said cooler compartment rear wall, said handle assembly comprising a generally U shaped handle having a gripping portion and two arm members extending from the ends thereof, said arm members being pivotably secured to said cooler compartment rear wall, said arm members further comprising locking means for selectively preventing said handle assembly from pivoting between a first and a second position;
- securing means extending in a generally downwardly direction from said side walls for assisting in securing roller means to said cooler compartment adjacent each of said side walls;
- said securing means securing said roller means such that said roller means is confined approximately between said securing means and said cooler compartment rear wall;
- said locking means further comprising a member selectively moveable between said arm members and a recess disposed in an approximate center of said container rear wall;
- said member further comprising stopping means for engaging with corresponding stopping means disposed on said arm members whereby upon the engagement of said arm member and sliding member stopping means said handle assembly can pivot approximately 180 degrees.

26. A portable wheeled cooler apparatus comprising:
- a cooler body defined by a front, rear, bottom, and two side walls, and a removable lid;
- roller means secured to a lower portion of said cooler body;
- a handle assembly secured to said cooler body, said handle assembly comprising a generally U shaped handle member having a gripping portion and two arm members extending from ends of said gripping portion said arm members pivotably secured to said cooler body rear wall, said handle assembly rotatable approximately 180 with respect to said cooler body rear wall;
- recess means disposed in said cooler body rear wall;
- a sliding member having projecting means for selectively engaging said arm members and for being selectively engaged within said recess, whereby said handle assembly is occupying an extended operational position when at least some of said projecting means are engaging said arm members and at least some of said projecting means are received within said recess, and said handle assembly is occupying a retracted and non-operational position when all of said projecting means are engaging said arm members.

27. A portable wheeled cooler apparatus according to claim 26, said projecting means further comprising locking means and corresponding locking means disposed adjacent and engaging each of said arm members, said locking means disposed adjacent and engaging said arm members and said projecting means for selectively preventing further movement of said sliding member.

* * * * *